United States Patent
Murata et al.

(10) Patent No.: US 7,535,140 B2
(45) Date of Patent: May 19, 2009

(54) ON-VEHICLE BELT-DRIVEN ALTERNATOR

(75) Inventors: Nakato Murata, Nagoya (JP); Atsushi Umeda, Okazaki (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 259 days.

(21) Appl. No.: 11/451,332

(22) Filed: Jun. 13, 2006

(65) Prior Publication Data

US 2006/0279151 A1    Dec. 14, 2006

(30) Foreign Application Priority Data

Jun. 13, 2005   (JP) .............................. 2005-171813

(51) Int. Cl.
*H02K 5/16* (2006.01)
*H02K 7/08* (2006.01)

(52) U.S. Cl. ....................................... 310/90

(58) Field of Classification Search ............. 310/89–91
See application file for complete search history.

(56) References Cited

U.S. PATENT DOCUMENTS

| 3,538,361 | A | * | 11/1970 | Haut et al. ................ 310/68 R |
|---|---|---|---|---|
| 4,288,712 | A | * | 9/1981 | Hagenlocher et al. ......... 310/91 |
| 4,551,120 | A | * | 11/1985 | Thomey ..................... 474/135 |
| 5,780,731 | A | * | 7/1998 | Matsui et al. ............ 73/114.01 |
| 2002/0094896 | A1 | | 7/2002 | Nakamura et al. |

FOREIGN PATENT DOCUMENTS

| JP | A-S62-114445 | 5/1987 |
|---|---|---|
| JP | UM-A-H01-116219 | 8/1989 |
| JP | A-2002-213547 | 7/2002 |
| JP | A 2002-227854 | 8/2002 |

* cited by examiner

*Primary Examiner*—Javaid Nasri
(74) *Attorney, Agent, or Firm*—Oliff & Berridge, PLC

(57) ABSTRACT

An on-vehicle alternator is disclosed having a rotor driven by an engine via a belt, a stator having armature windings to generate electromotive forces in response to rotating magnetic fluxes, a housing on which the stator is fixedly secured, a pulley fixedly supported on the rotor to transmit a belt drive force to the rotor, and bearings rotatably supporting the rotor and fixedly supported on the housing. The power generator also includes a bush, formed of a metallic member, which is accommodated in the housing. The bearing, disposed in an area closer to the pulley, is comprised of an inner race, an outer race and rolling elements, all of which are formed of metallic members, with the outer race being press fitted to the bush with a certain degree of interference.

8 Claims, 5 Drawing Sheets

ON-VEHICLE BELT-DRIVEN ALTERNATOR

CROSS REFERENCE TO RELATED APPLICATION

This application is related to Japanese Patent Application No. 2005-171813 filed on Jun. 13, 2005, the content of which is hereby incorporated by reference.

BACKGROUND OF THE INVENTION

1. Technical Field of the Invention

The present invention relates an on-vehicle alternator (a AC-generator to be mounted on a vehicle), installed on a vehicle such as a passenger car or a truck, which is driven by an engine via a belt drive system.

2. Description of the Related Art

In recent years, auxiliary-unit component parts such as an on-vehicle alternator, an air conditioning unit and an idler pulley are installed on a motor vehicle and incorporate rolling bearings, respectively. These rolling bearings are probable to suffer severe conditions in vibrations and temperatures. Under such conditions, the rolling bearing has undergone a tissue change in a new pattern accompanied by the occurrence of flaking. This flaking takes place in any area of an inner race, an outer race and balls (or rollers) of the bearing. This flaking has a feature that differs from a commonly known rolling fatigue life of the related art and once flaking occurs, flaking takes place on the outer race surface in an area associated with the ball within a short-time period (in the ratio of approximately $1/100$ to $1/1000$ times that of the related art).

Further, such a flaking phenomenon is not caused to necessarily occur in a rolling bearing installed on a vehicle and subjected to increased stress such as increased vibration or high temperatures and it was hard to specify what was a cause of such a failure. Therefore, stopgap measures have been taken for the rolling bearing with no clear scientific basis and no full-fledged measure has heretofore been taken to address the issue arising in current conditions. For example, it has been considered in the related art that for a cause of such a flaking phenomenon, water molecules in grease or water resulting from dew condensation are decomposed accompanied by generation of hydrogen ions that penetrate into metallic component parts such as an outer race or balls to cause hydrogen brittleness under which early flaking was caused to take place (as disclosed in, for instance, Japanese Patent Laid-Open Publication No. 2002-227854). However, even with the use of grease adapted to suppress the hydrogen generation, no early flaking has heretofore been addressed as expected.

In particular, among the auxiliary-unit component parts, a vehicular alternating current generator (also called an alternator) has a maximum speed-up ratio and equivalent inertia with a numeric value times the square of a speed-up ratio further increases. Therefore, the bearing of such an alternator had encountered flaking failures in the highest frequency during reliability tests conducted in the related art. Moreover, the auxiliary-unit component parts, installed on a Poly-V belt, whose tension was set to an increased level, or a belt drive system with an auto-tensioner adapted to prevent the loosening of a belt had a tendency of encountering flaking failures in an increased frequency.

By using a rotating fluctuation test applying a rolling bearing with simply repetitive rotating fluctuation as shown in FIG. 6, the present inventors have revealed that the flaking phenomenon can be caused to reoccur on the rolling element. This test has been conducted in a way to rotate the rolling bearing with rotation ripples in the order two times a rotational speed (at a value equivalent to an order of explosions of the engine) by applying the rotation ripples at an average rotating fluctuation rate of 2% (corresponding to a quite common fluctuation rate in such a rotational speed of an actual engine wherein the fluctuation rate varies in a range greater than 30%) upon controlling an electric motor with a view to simulating vibration of the actual four-cylinder engine. FIG. 7 is a view showing conditions such as a rotational speed pattern used in the test. The belt tension was set to reach an average value of a commonly used vehicle.

As a result, a failure could be caused to reoccur on the ball with flaking. Further, a noteworthy point is the finding of the failure, appearing immediately after the occurrence of flaking, with a feature of an indentation formed on a raceway track of the ball as shown in FIG. 8. No increased load was applied to the rolling bearing under the recurrence test condition and no probability occurs in the occurrence of flaking in nature. The indentation (in plastic deformation) is probable to occur in a case where stress resulting from load exceeds yield stress and the indentation tends to occur with further lessened stress when a frictional force is created on an abutment surface (during a defective lubricating condition). As a consequence, the present inventors have made assumption that the lubricating defect has occurred accompanied by the formation of the indentation not because of increased load but because of some conditions. During operation of the bearing, rotation of the ball causes grease to be dragged to form an oil film. However, if assumption is made that due to some condition, a collision takes place between the outer race and the ball under a condition with no presence of a relative speed, no oil film is formed due to the dragging of the ball and, hence, no lubrication takes place between associated component parts with base oil which was supposed to perform rotating lubrication.

The present inventors have made the assumption that a condition, which is hard for an EHL theory (elastic hydraulic lubrication theory) to be established, is caused to occur, like a collision resulting from an appropriate speed component, based on the vehicle and rotation stress causing defective lubrication between a bearing drive wheel (inner race) and the ball accompanied by the formation of the indentation. A further consideration has been taken that damage occurs in a favorable bearing function on the basis of such an indentation accompanied by the occurrence of flaking.

With the rolling bearing used in the on-vehicle alternator, it has been a general practice to allow a clearance between the inner and outer race and the ball to be provided in the order of several micro millimeters so as to avoid an extreme degree of interference pressure from being exerted to these component elements. This minimizes temperature rise and prevents the associated component parts from suffering from seizing due to a contact between the associated metallic component parts resulting from heat deterioration of grease. However, the presence of clearance naturally causes a collision to take place between the inner and outer race and the ball due to vibration. A design of the clearance of the bearing in present days is usually made on the basis of a premise that a on-vehicle alternator is used under high temperature conditions and the design is made so as to avoid the occurrence of seizing even if distortion occurs in the inner and outer races of the bearing. Accordingly, if a bearing is manufactured with a lessened clearance, a new issue arises with the occurrence of a seizing failure.

SUMMARY OF THE INVENTION

The present invention has been completed with a view to addressing the above issues and has an object to provide a on-vehicle alternator that can prevent a bearing from suffering from flaking due to stress applied from a vehicle to maintain the bearing in increased reliability.

To achieve the above object, the on-vehicle alternator is comprised of a rotor driven by an engine via a belt to generate rotating magnetic fluxes, a stator having armature windings to generate electromotive forces in response to the rotating magnetic fluxes, a housing on which the stator is fixedly secured, a pulley fixedly supported on the rotor to transmit a belt drive force to the rotor, and bearings rotatably supporting the rotor and fixedly supported on the housing. The power generator also includes a bush formed of a metallic member accommodated in the housing. The bearing, disposed in an area closer to the pulley, is comprised of an inner race, an outer race and rolling elements, all of which are formed of metallic members, with the outer race being press fitted to the bush with a certain degree of interference.

With the on-vehicle alternator of the related art, it is a general practice for a bearing to be press fitted to and fixedly supported by a housing made of aluminum such that an outer race is not caused to rotate or remove from the bearing. However, high heat develops in the on-vehicle alternator during the operation to generate electric power under high temperature conditions of an engine. This results in the occurrence of thermal stress between the housing and the bearing due to a difference in thermal expansion coefficients. Simply speaking, thermal stress acts in a direction to loosen the extent of press-fitting interference. Under such circumstances, a raceway track (on surfaces of the outer race and inner race opposing to the rolling elements) tends to be distorted due to adverse affects resulting from the stator portion or windows of the housing or fixture bolts fastened thereto for compensating loosened interference.

In contrast to such issues encountered in the related art, with the present invention, since the bearing is press fitted to the bush, formed of a metallic member, with a given extent of interference, the bearing exhibits the same coefficient of thermal expansion as that of the bush playing a role as a fixture member to which the bearing is press fitted and no distortion takes place in the raceway track of the bearing. Moreover, the metallic member, forming the bush, has higher rigidity than that of an aluminum member with the resultant capability of preventing the bush and the bearing from being distorted due to load resulting from tension of the belt. Accordingly, the bearing can be manufactured in a structure with a minimal clearance between the inner and outer races and the rolling elements. This enables remarkable reduction in a probability of a collision between the rolling elements and the raceway track with the resultant increase in efficiency of avoiding the occurrence of flaking failure in the bearing. Also, due to the absence of seizing occurring in the bearing, the on-vehicle alternator can have increased reliability in operation.

Further, the bush may be preferably press fitted to the housing. Permitting the bush to be fixedly supported with the housing makes it possible to manufacture a whole of the on-vehicle alternator, including the housing, in a compact structure.

Furthermore, the bush may be preferably formed into a unitary structure with the housing by casting. Permitting the bush to be fixedly supported with the housing by casting makes it possible to manufacture a whole of the on-vehicle alternator, including the housing, in a compact structure.

Moreover, the bush may preferably have an inner peripheral surfaces opposite to the outer race of the bearing, subjected to cutting work after the housing has fixedly retained the bush. By permitting the bush to be subjected to cutting work after the housing has been fixedly supported the bush, a distorted area of the bush, resulting from fixing the bush into the housing, can be removed. This enables further reduction in distortion of the raceway track of the bearing, making it possible to achieve further minimization of a clearance between the inner and outer races and the rolling element of the bearing.

Additionally, the belt may preferably include a Poly-V belt. The Poly-V belt is usually set to have an increased tension level. This results in increases in axial loads acting on respective auxiliary-unit component parts involving the on-vehicle alternator. As a result, a spring force acts on the respective auxiliary-unit component parts with the resultant increase in an impact force occurring when a collision takes place between the raceway track and the rolling element of the bearing, thereby causing a deficiency to be liable to occur due to the collision. Moreover, the bearing is liable to be distorted due to load of the belt with a remarkably increased trend for the bearing especially placed in an area closer to the pulley. On the contrary, the present invention has an advantageous effect of maintaining the raceway track of the bearing in a stabilized shape. This enables the prevention of a collision between the raceway track and the rolling element of the bearing, enabling the provision of a on-vehicle alternator with increased reliability in operation.

In addition, the belt drive system, employing the belt for transferring output torque from the engine to the pulley, may preferably include a serpentine system. With the belt drive system of the serpentine type, a single belt is used to drive a large number of auxiliary-unit component parts and liable to rotate in an instable condition. Moreover, the number of belt resonances, resulting from lateral vibration and longitudinal vibration, corresponds to the number of drive shafts with the resultant increase in a probability in matching between the rotational speed, at which resonance occurs, and an actual rotational speed. Therefore, stress is present due to rotation and vibration with the resultant increase in a liability of the occurrence of a collision between the raceway track and the rolling element of the bearing. Consequently, applying the present invention to such a belt drive system enables the expectation of advantages effects of preventing the occurrence of flaking failure while enhancing increased reliability.

In addition, the belt drive system may preferably include more than five axes. Especially, with the belt drive system of the serpentine type with more than five axes, the characteristic equations of the system have many probabilities to be of more than five orders with a difficulty of obtaining an eigen value on a theory. This results in a difficulty of making a design of resonance with increased tendency of the occurrence of a failure resulting from unexpected resonance. Consequently, applying the present invention to such a belt drive system results in capability of advantageous effects of preventing the occurrence of flaking failure while enhancing increased reliability in operation.

Besides, the belt drive system may preferably include an auto-tensioner for automatically regulating tension of the belt. The auto-tensioner has a function to forcibly press the belt under a condition to keep the belt in fixed tension. However, during transient fluctuation in tension of the belt, an inherent spring force tends to apply impact load onto the auxiliary-unit component parts by means of the belt. With the present invention, the bearing has a lessened probability of a collision between the raceway track and the rolling element with the resultant capability of preventing the bearing from suffering from flaking caused by impact load resulting from the use of the auto-tensioner while keeping enhanced reliability.

DETAILED DESCRIPTION OF PREFERRED EMBODIMENTS

An on-vehicle alternator of one embodiment according to the present invention is described in detail with reference to the accompanying drawings.

Figure 1:
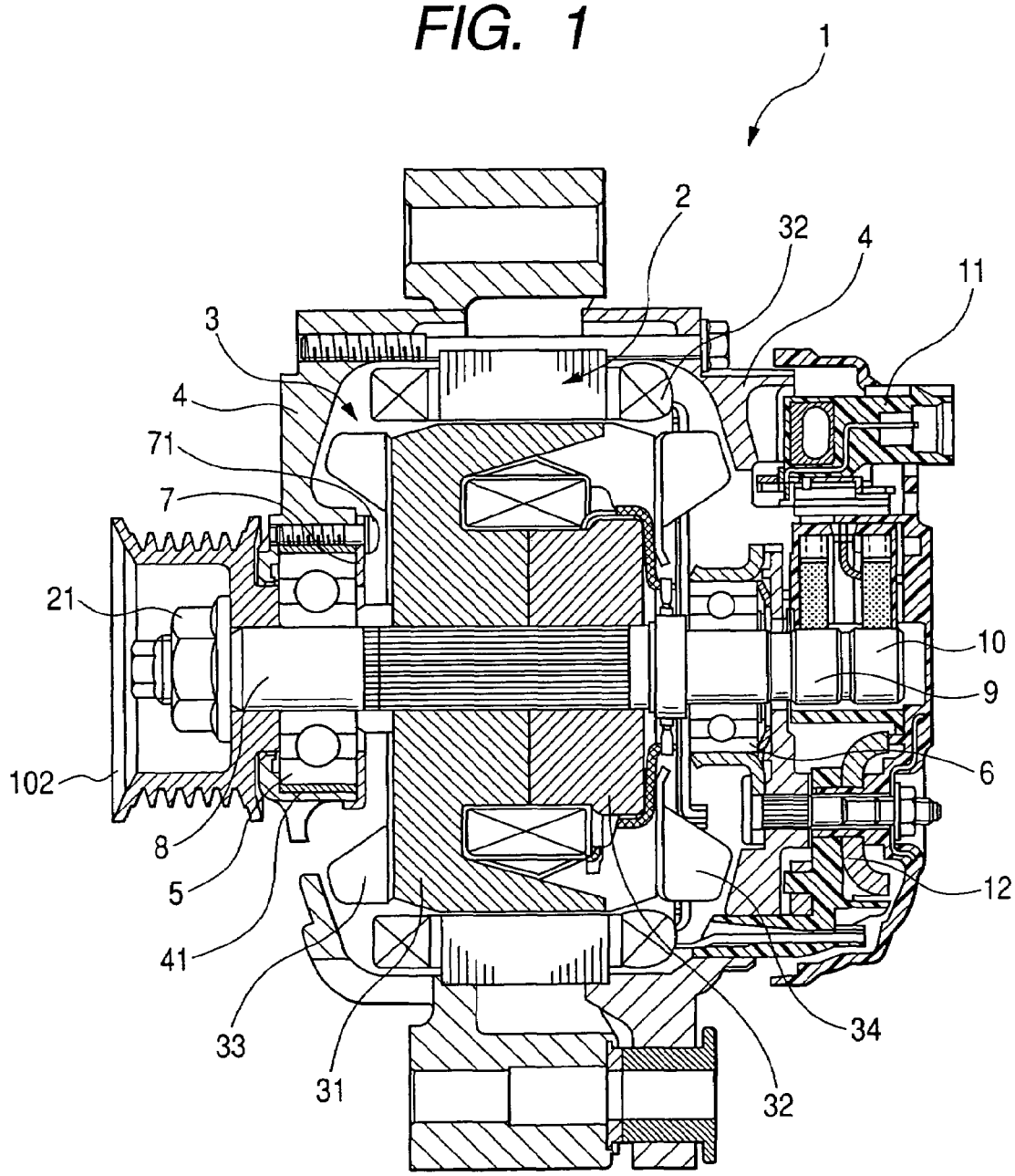
FIG. 1 is a cross-sectional view of an overall structure of a on-vehicle alternator of one embodiment according to the present invention.
Figure 2:
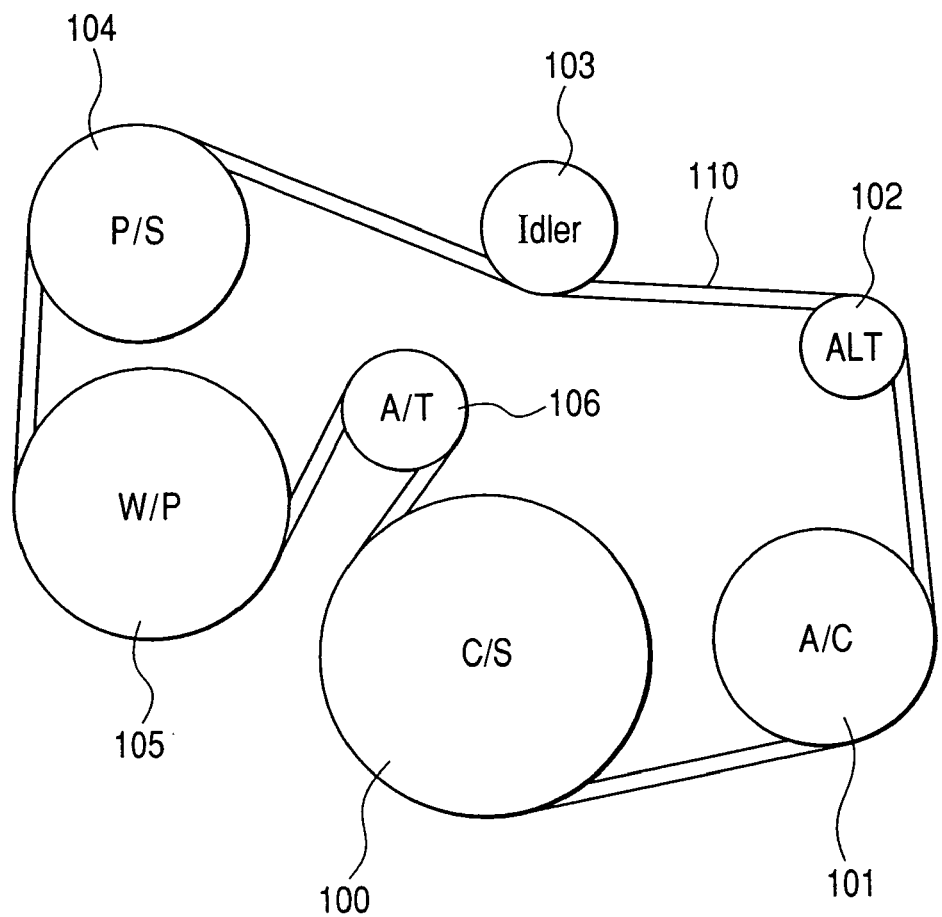
FIG. 2 is a view showing a layout of a belt drive system involving the on-vehicle alternator shown in FIG. 1.

FIG. 1 is a cross-sectional view showing an overall structure of the on-vehicle alternator of the present embodiment. Further, FIG. 2 is a view showing a structure of a belt drive system including the on-vehicle alternator shown in FIG. 1. As shown in FIG. 2, with the present embodiment, the belt drive system includes a serpentine type drive system with seven axes of seven kinds of pulleys 100 to 106, held in engagement with a belt 110, which are fixedly secured to a crankshaft (C/S), an air conditioning unit (A/C), the on-vehicle alternator (A/T), an idler (idler), a power steering (P/S), a water pump (W/P) and an auto-tensioner (A/T) for rotation therewith. For instance, a pulley 102 of the on-vehicle alternator is set to have a diameter 1/1.3 times that of a crank pulley 100 and the rotational speed of the on-vehicle alternator is set to an increased speed of a value 3.3 times that of the rotational speed of the engine crankshaft. Further, the belt 100 is comprised of a six-recess type V-belt. The crank pulley 100 has a slack side that is held in engagement with the auto-tensioner 106 of a screw-spring type to allow a belt tension to be fixed stationary on the slack side. With the present embodiment, the belt tension is set to a value of 400N. The belt drive system is of the so-called serpentine system employing a single belt to drive a large number of auxiliary units. As shown in FIG. 2, the belt 110 is driven with the crankshaft (C/S) to drive the air conditioning unit (A/C), the on-vehicle alternator (A/T), the idler (idler), the power steering (P/S), the water pump (W/P) and the auto-tensioner (A/T) in this order.

As shown in FIG. 1, further, the on-vehicle alternator 1 is comprised of a stator 2 carrying thereon armature windings for generating electromotive forces due to rotating magnetic fluxes, a rotor 3 playing a role as a magnetic field to produce the rotating magnetic fluxes, a front bearing 5 (on a front side closer to the pulley 102) and a rear bearing 6 (on a rear side opposite to the pulley 102), a housing 4 by which the stator 2 is fixedly supported, a rectifier 12 electrically connected to the stator 2 for converting AC power to DC power, and a voltage regulator 11 arranged to increase or decrease the amount of field current for controlling a rate of electric power to be generated.

The rotor 3 is integral with a rotary shaft 8 to be rotatable therewith and includes Lundell-type pole cores 31, 32 and cooling fans 33, 34. The rotary shaft 8, rotatably supported by the front and rear bearings 5, 6, has one end onto which the pulley 102 is tightly fixed by means of a nut 21 and the other end carrying slip rings 9, 10.

Figure 3:
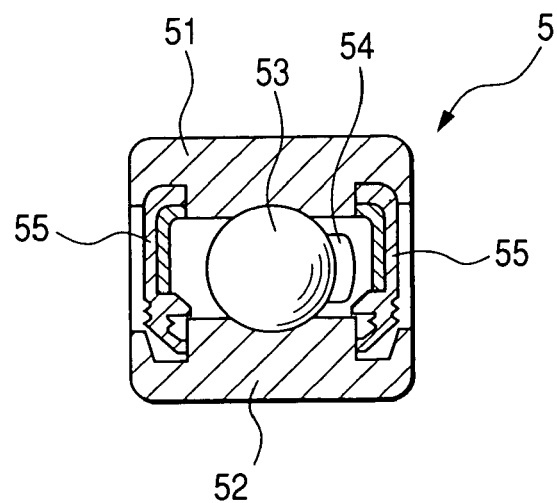
FIG. 3 is a cross-sectional view of a front bearing.

Hereunder, the front bearing 5 and the associated surrounding structure are described. FIG. 3 is a cross-sectional view of the front bearing 5. Also, the rear bearing 6 has the same structure as that of the front bearing 5 except for a size in dimension. As shown in FIG. 3, the front bearing 5 is comprised of an outer race 51, an inner race 52, balls 53 each playing a role as a rolling element, a retainer 54 for holding the balls 53 in fixed place for rotating capabilities, front and rear water-proof seals 55, 55, and lubricating medium such as grease (not shown) internally filled in the bearing. With the present embodiment, the front bearing 5 has the outer race 51 with the maximum outer diameter of 47 mm and the inner race 52 with the minimum inner diameter of 17 mm. Also, the rear bearing 6 has the outer race 51 with the maximum outer diameter of 35 mm and the inner race 52 with the minimum inner diameter of 15 mm. Moreover, each ball 53 of the front bearing 5 has a diameter of 6 mm and eight pieces of balls 5 are employed. The front and rear bearings 5, 6 employ the same type of grease. With the front bearing 5, the outer race 51 has one axial end face pressed forward by a retainer plate 7, which is fixedly secured to the housing 4 by means of a plurality of bolts 71.

Figure 4:
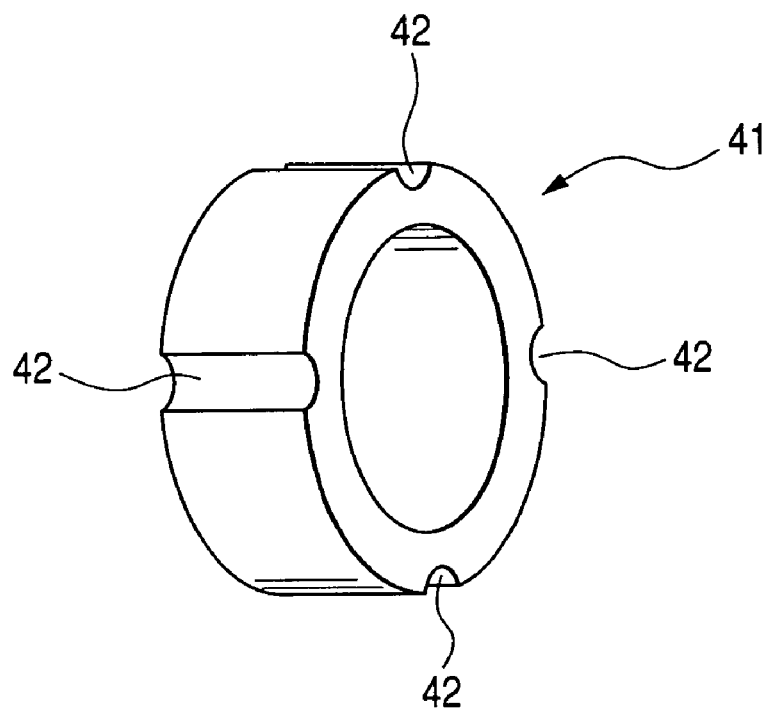
FIG. 4 is a perspective view showing an outer appearance of a bush.

A bush 41, made of an iron member, is press fitted to the to housing 4 for retaining the front bearing 5 in a fixed place. FIG. 4 is a perspective view showing an outer profile of the bush 41. As shown in FIG. 4, the bush 41 has a cylindrical shape whose outer periphery is formed with axially extending recesses 42 at equidistantly spaced four positions in a circumferential direction. These recesses 42 are formed on the bush 41 at positions in association with the bolts 71 used for fixing the retainer plate 7 and play a role as escape portions to avoid any interference with the bolts 71, respectively. With the bush 41 being press fitted to the housing 4 for fixing, an inner diameter of the bush 41 is subjected to cutting work. Thereafter, the outer race 51 of the front bearing 5 is press fitted to the inner diameter portion of the bush 41. When this takes place, for the purpose of creating appropriate clearances between an outer peripheral surface of the front bearing 5 and the balls 53, an appropriate degree of interference is provided between the outer peripheral surface of the front bearing 5 and an inner peripheral surface of the bush 41.

Thus, the front bearing 5 is press fitted to the bush 41 with given interference. The outer race 51, the inner race 52 and the balls 53 of the front bearing 5 of the on-vehicle alternator 1 may be suitably made of material such as an iron member formed of SUJ2 because of inherent strength. With the present embodiment, since the bush 41 is made of iron, the front bearing 5 and the bush 41, playing a role as a stationary member, exhibit the same heat expansion properties even under a condition where these component parts are exposed to high temperature conditions during the operation to generate electric power and no probability takes place for a raceway track of the bearing ((especially of the outer race 51) of the outer race 51 and the inner race 52) to be distorted.

Further, the bush 41 takes a cylindrical configuration in a substantially uniform profile in a radial direction. Therefore, the bush 41 is not adversely affected from stay portions or window portions of the housing 4 in contrast to the housing 4 and is stabilized in shape with an increased roundness. Also, the bush 41 has higher rigidity than that made of aluminum with the resultant capability of avoiding distortion resulting from belt tension load and distortion caused by axial forces of the bolts via the retainer plate 7.

Furthermore, with the inner peripheral surface of the bush 41 subjected to cutting work after press fitting with the bush 41 to the housing 4, distorted portions, appearing when press fitting the bush 41 to the housing 4, can be removed from the inner peripheral surface of the bush 41. This results in capability for the bearing raceway track to have a further uniformed surface after press fitting the front bearing 5 into the bush 41.

Accordingly, a clearance between the outer race 51 and inner race 52 and the balls 53 of the front bearing 5 can be minimized with the resultant remarkable improvement in a probability of collisions between the balls 53 and the bearing raceway track (with a minimized probability in collision). This enables a reduction in the occurrence of defective flaking caused by an indentation resulting from the collision. Moreover, due to lessened probability of troubles in seizing of the component parts, the on-vehicle alternator 1 can be kept in high reliability.

When taking stress, exerted from a vehicle, into consideration, a collision is liable to occur between the component parts (between the outer race 51 and inner race 52 and the balls 53 of the front bearing 5) under conditions, listed below, and the use of a structure around the front bearing 5 of the present embodiment is particularly effective under such conditions.

A component part of an auxiliary unit takes equivalent inertia, as viewed from an area closer to an engine, which lies at a numeric value times the square of a speed-up ratio. The belt undergoes elastic stretch such that the greater the equivalent inertia of the auxiliary-unit component part, the more frequent will be the unstable behavior of the belt due to elastic stretch of the belt. The on-vehicle alternator 1 has a speed-up ratio in the order of 2 to 3 (with an exemplary structure, shown in FIG. 2, having a speed-up ratio of 3.3) at the highest speed-up ratio in contrast to those of the other auxiliary-unit component parts. Consequently, employing the structure (including the bush 41 and associated fixing structure or the like) in an area around the front bearing 5 results in the most advantageous effect in avoiding the occurrence of flaking in the front bearing 5.

Moreover, the Poly-V belt is usually set to a high tension with the resultant increase in axial load exerted to the pulleys of the respective auxiliary-unit component parts. This results in an increase in an impact force occurring during a collision between the bearing raceway track and the ball 53 and troubles are liable to take place. With such a belt drive system, the use of the structure of the present embodiment is quite advantageous in avoiding the occurrence of flaking of the bearing.

Further, with the belt drive system of the serpentine system, the single belt drives a large number of auxiliary-unit component parts and is liable to rotate in an instable status. Also, since belt resonance in lateral vibration and longitudinal vibration is present only in an area around the drive shaft, the belt has an increased probability of matching between the rotational speed and an actual rotational speed at which resonance occurs. This results in the occurrence of stress between the rotation and the vibration and, hence, a collision is liable to occur between the associated bearing component parts. In particular, with a belt drive system of a serpentine system with shafts more than five axes, many probabilities occur wherein a characteristic equation of the system takes a value in a five-dimensional order with the resultant difficulty in obtaining an idealistic eigen value. Consequently, applying the structure of the present embodiment to such a belt drive system enables an advantageous effect to be expected for avoiding the occurrence of flaking troubles while enhancing increased reliability.

With the belt drive system with the auto-tensioner, the auto-tensioner has a function to maintain the belt under a certain tensioned status for keeping the belt in fixed tension. However, during transitional fluctuations in tension of the belt, an inherent spring force, resulting from the auto-tensioner, tends to apply impact loads to the auxiliary-unit component parts via the belt. The use of the structure of the present embodiment provides capability of reducing a probability in collision between the associated component parts of the bearing. Therefore, the use of the structure of the present embodiment is still advantageous even for the belt drive system with the auto-tensioner in avoiding flaking troubles encountered by the bearing. That is, the use of the structure of the present embodiment enables the avoidance of flaking in the bearing resulting from impact load exerted when using the auto-tensioner while keeping high reliability.

Figure 5:
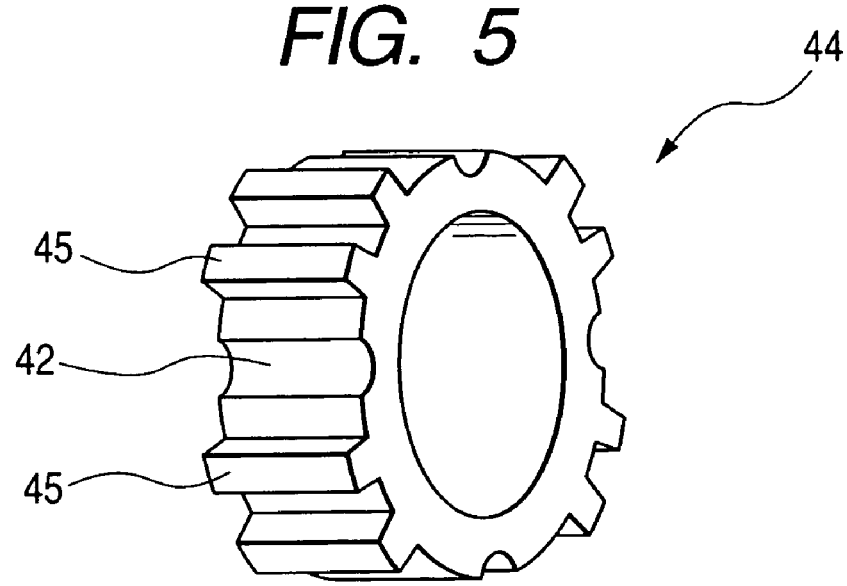
FIG. 5 is a view showing a modified form of the bush configured in a structure suitable for casting formation.
Figure 6:
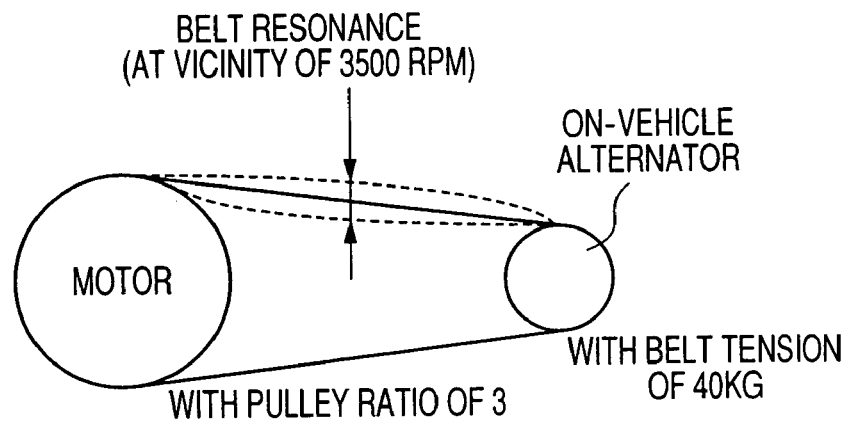
FIG. 6 is a view for illustrating a rotating fluctuation test.
Figure 7:
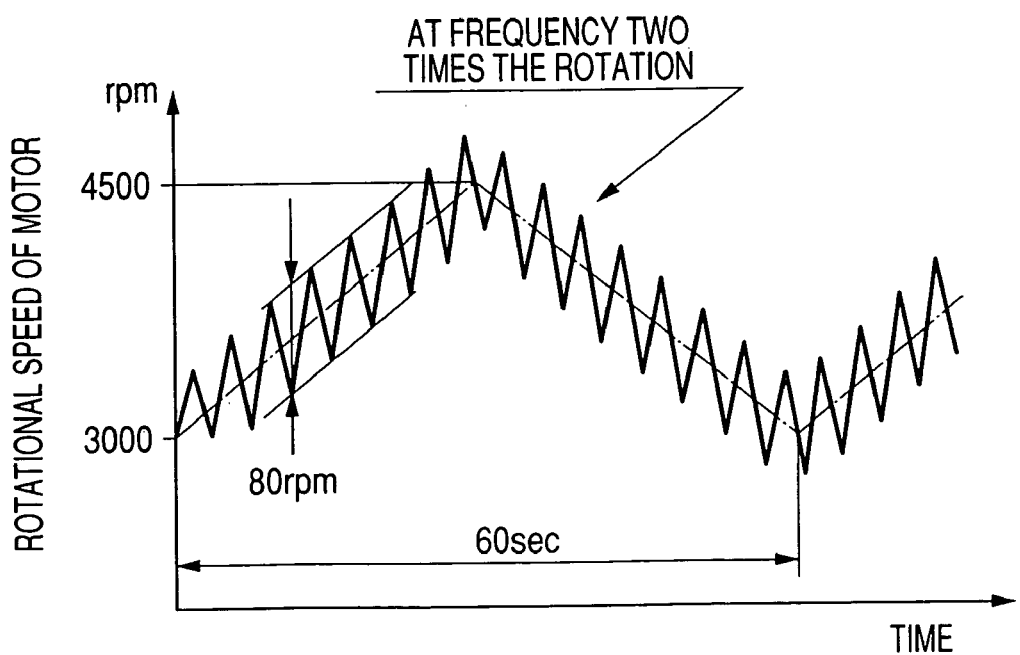
FIG. 7 is a graph showing a rotating condition for the rotating fluctuation test.
Figure 8:
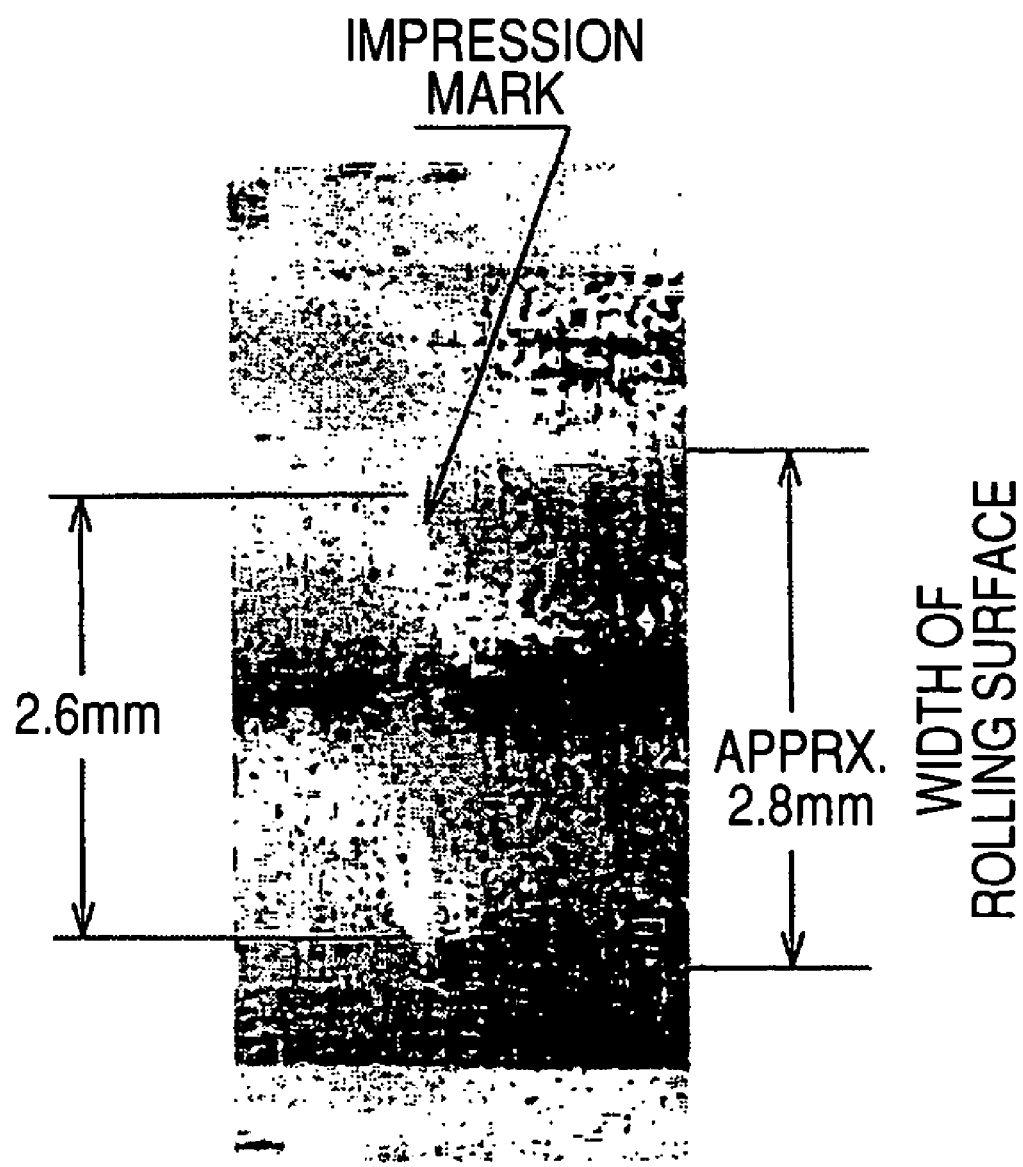
FIG. 8 is a view showing a raceway track of an actual sample formed with a defect occurring during the rotating fluctuation test.

Also, the present invention is not limited the embodiment described above and various modifications may be possible to be implemented within the scope of the present invention. While with the embodiment set forth above, the bush 41 is press fitted to the housing 4, the bush 41 may be formed with the housing 4 by casting to allow the bush 41 to be fixedly secured to the housing by casting technique. FIG. 5 is a perspective view of a modified form 44 of the bush particularly suited for casting formation. As shown in FIG. 5, the bush 44 has an outer diametrical periphery formed with a large number of equidistantly formed splines 45 to provide increased joint strength with respect to the housing 4. By casting the housing 4 integrally formed with the bush 44, no need arises for providing the retainer plate 7 or the like, making it possible to form an overall structure of the on-vehicle alternator 1 in a compact structure.

Moreover, the structure of the present invention may be applied to any belt-drive rotary electric machines.

What is claimed is:

1. An alternator to be mounted on a vehicle and adapted to be driven by an engine of the vehicle via a belt, comprising:
   a rotor driven by the engine for generating rotating magnetic fluxes;
   a stator having armature windings for generating electromotive forces in response to the rotating magnetic fluxes;
   a housing by which the stator is fixedly supported;
   a pulley fixedly secured to the rotor to transfer belt drive power to the rotor;
   bearings fixedly supported by the housing and rotatably supporting the rotor; and
   a bush made of an iron member and formed to have a cylindrical form with a cylindrical inner surface and an outer surface from which a plurality of protrusions extend, the bush fixedly secured to the housing at the outer surface thereof by casting formation;
   wherein one of the bearings, placed closer to the pulley, comprises an inner race, an outer race and rolling elements, all of which are made of iron members, and the outer race is press fitted to the inner surface of the bush with given interference.

2. The alternator according to claim 1, wherein the belt comprises a Poly-V belt.

3. The alternator according to claim 1, wherein the belt comprises a belt drive system of serpentine type in which the belt transfers a torque output of the engine to the pulley.

4. The alternator according to claim 3, wherein the belt drive system has more than five axes at each of which auxiliary devices of the vehicle are linked to be driven to rotate.

5. The alternator according to claim 4, wherein the belt comprises a Poly-V belt.

6. The alternator according to claim 1 wherein the belt drive system includes an auto-tensioner for automatically regulating a tension of the belt.

7. A rotary electric machine adapted to be driven via a belt, comprising:
- a rotor driven via the belt;
- a stator having armature windings;
- a housing by which the stator is fixedly supported;
- a pulley fixedly secured to the rotor to transfer belt drive power to the rotor;
- a bearing fixedly supported by the housing and rotatably supporting the rotor; and
- a bush made of an iron member and formed to have a cylindrical form with a cylindrical inner surface and an outer surface from which a plurality of protrusions extend, the bush fixedly secured to the housing at the outer surface thereof by casting formation;

wherein the bearing, placed closer to the pulley, comprises an inner race, an outer race and rolling elements, all of which are made of iron members, and the outer race is press fitted to the inner surface of the bush with given interference.

8. The rotary electric machine according to claim 7, wherein the belt comprises a Poly-V belt.

* * * * *